UNITED STATES PATENT OFFICE 2,454,795

POLYMERIZATION OF ROSIN

Burt L. Hampton, Jacksonville, Fla., assignor, by mesne assignments, to The Glidden Company, Cleveland, Ohio, a corporation of Ohio No Drawing. Application June 10, 1946, Serial No. 675,827

14 Claims. (Cl. 260—97)

The present invention relates to processes for the polymerization of rosin.

Polymerized rosin and its useful derivatives have many advantageous properties over ordinary unpolymerized rosin and its derivatives, such as higher melting points, higher viscosity, greater stability toward oxidation, and many others. The use of zinc chlorides or stannic chlorides as catalyst for the polymerization has been previously proposed but the catalyst is either left in the product or numerous washings are required for its removal. United States Patent 2,247,399 describes the use of zinc chlorides as a catalyst for the polymerization, but for practical commercial operation at least 1½% of the catalyst is required.

I have discovered that other metal halides described hereinafter are effective as polymerization catalysts and that by activating these halides with certain free hydrohalogen acids, smaller amounts of the halides may be employed, and the washing difficulties of prior processes may be minimized.

It is accordingly an object of the present invention to provide a new process for producing polymerized rosin.

An additional object is to provide processes for polymerizing rosin which employ new catalysts activated or not by means of free acid.

Another object is to provide a process for polymerizing rosin whereby the halide catalyst employed may be readily removed by washing.

A further object is to provide an improved process for polymerizing rosin, in which the amount of metal halide employed as catalyst during polymerization is lowered.

Other objects will be apparent to those skilled in the art from the following description.

In the course of my experimental research in the polymerization of rosin, I have found that cobaltous chloride and bromide are effective polymerization catalysts for gum and wood rosins. The amount of such halide catalyst which is employed may range from about 0.5% to about 10% based on the weight of rosin present, whether as rosin per se or as rosin dissolved in a suitable solvent. The preferred limits, however, are from about 1% to 5%.

I have also found that when the above mentioned cobaltous halides are activated by the presence of either free hydrochloric or hydrobromic acid, smaller amounts of catalyst may be used with equal effectiveness. Under such conditions, amounts of the cobalt salts as small as .01% are effective and for most purposes amounts less than about 1% are satisfactory with amounts between about 0.3% and 0.7% being preferred. Concentrations of catalyst between 1% and 10% may be used with activating acids, but the disadvantages of added cost and greater washing difficulties resulting from the use of the larger amounts of catalyst are not sufficiently offset by the benefits. Only small amounts of free acid are needed to effect the activation, but amounts greater than a mere trace should be provided to ensure continued effectiveness throughout the duration of the polymerization treatment. For most purposes initial concentrations of free acid between about .2% and .5% provide an adequate excess but under less favorable conditions such as those of prolonged treatment greater initial concentrations of around 2% to 3%, or even up to 5% may be needed. It is within the ability of one skilled in the art to determine the desired concentrations under his selected working conditions, in accordance with the foregoing indications. It should be recognized, however, that the free acid should be kept sufficiently low to avoid undesirable degradation of the material being treated, or of the final product.

The cobaltous chlorides or bromides may be generated in situ, if preferred, instead of employing the halide salts per se. This can be accomplished conveniently by reacting metallic cobalt or a cobaltous compound such as the oxide, hydroxide, carbonate, fluoride or iodine with hydrochloric or hydrobromic acid. When the activating effects of free acid are desired, the in-situ production of the catalysts should be accomplished by employing enough of the acids or acid-producing materials to convert all of the compounds to the corresponding halides, and to provide some free acid in addition.

The acid employed for activation of the catalysts, or for their in-situ production, may be introduced as the hydrogenhalide compound or it may be generated in-situ by using materials which produce hydrochloric or hydrobromic acid under the conditions of treatment. Hydrogenchloride-producing compounds and hydrogenbromide-producing compounds are well known to those skilled in the art, but for purposes of example, the following materials are mentioned: chlorine, phosphorous chlorides, phosphorous bromides, benzoyl chloride, acetyl chloride, and other organic acid chlorides or bromides. The reactions which are involved in producing free hydrogenhalides from these and like materials are well understood. Reference may be made, however, to "An Outline of Organic Chemistry"

by Degerring, published in 1941 (4th edition) where typical reactions with aliphatic and aromatic compounds are explained on pages 37 and 185–187 respectively.

While the polymerization, either with or without activating acid, may be carried out on the molten rosin, it is preferable to carry it out on rosin dissolved in an inert solvent. Suitable solvents are glacial acetic acid, mineral spirits, benzene, toluene, xylene, chloro-benzene, ethylene chloride, and many other liquids known already to those skilled in the art. Various concentrations of rosin in solvent from about 30% to 100% have been employed with success, and of these, a solution of about 80% rosin has been found to be the most desirable from practical considerations.

Rosin generally contains some oxidized products and upon addition of the hydrohalogen acid or of the hydrogenhalide-producing material, small quantities of water are formed. Likewise, when a cobaltous oxide is employed as catalyst, water is formed by reaction between it and the hydrohalogen acid. The removal from the rosin or rosin solution of water from such sources is not essential to effect polymerization, but for producing the more highly polymerized materials it is advantageous to remove such water as well as any water present as such in the rosin or rosin solution.

According to a preferred procedure, a solution of rosin is first formed in an inert solvent. A small quantity of cobaltous halide or of a low-valent oxide of cobalt is then added. Chlorine, hydrogen chloride, or a material which yields HCl is next added in a quantity sufficient to produce some free HCl. The solution is then heated to the desired temperature, which preferably is around the boiling point of the solution but which may be any temperature between about 50° C. and 165° C., and is heated for a predetermined time between about ½ hour and 100 hours to produce the desired degree of polymerization. The concentration of solvent in the mass is then adjusted (if necessary to facilitate washing) and the solution is washed with water to ensure removal of the metal halide catalyst. Acid may be added to the wash water to assist in the removal where the amount of catalyst employed is much larger than the indicated limit on the preferred range, supra. In case the polymerization is carried out on molten rosin, treating temperatures ranging from the melting point to about 165° C. may be employed, and after the treatment is completed the polymerized rosin should be put into solution for washing, and then washed. In either case the washed solution is next distilled or otherwise treated to separate the solvent. After such distillation or separation, the product is characterized by the presence of loosely combined HCl. This product would present disadvantages in manufacturing various products therefrom such as ester gum, etc. in which heating to elevated temperatures is employed. It is therefore desirable to remove the loosely combined HCl. This can be done by bringing the polymerized rosin to temperatures of the order of 250° C. to 340° C., and sparging the heated rosin by passing in steam or other inert gas or vapor to sweep out the liberated HCl. Bromine, hydrogen bromide, or a material which yields HBr may be used in place of the corresponding chlorine materials, and in the same way.

The product after removal of all of the HCl or HBr will be found to have a higher melting point and a higher viscosity in solution, and to be more resistant to oxidation than the original rosin.

The following examples are illustrative of the invention:

Example I 400 parts of WW gum rosin M. P. 76° C., A. N. 169 was heated to 180° C. and 2 parts of $CoCl_2.6H_2O$ added with good stirring. After most of the metal halide had gone into solution 100 parts of acetic acid was added together with 4 parts of ecetyl chloride. Gentle reflux was maintained for 6 hours at temperatures below about 165° C. The solution immediately turned a very deep green which color was dissipated upon washing the solution with water. At the end of the reaction period the solution was poured into mineral spirits and washed 4 times with water. The solvent was removed with steam. R & B M. P. 96° C.; acid number 164, grade I.

Example II 500 parts of WW gum rosin M. P. 76° C., A. N. 169 was heated to 150° C. with stirring and 18 parts of $CoCl_2.6H_2O$ was slowly added. All of this salt did not go into solution as some blue anhydrous salt settled out on the bottom of the tank. However, some went into solution and a reaction occurred as the rosin assumed a deep green tinge. Heating was continued for 5.5 hours, the resin poured into mineral spirits, washed with dilute HCl and finally twice with hot water. The solvent was then removed with steam, the final temperature of the resin being 210° C. R & B M. P. 86° C.; acid number 163, grade H.

Example III 400 parts of WG-gum rosin M. P. 76° C., A. N. 168 from which the metals had been removed by an acid wash of the original gum was dissolved in 100 parts of xylene, and 4 parts of $CoCl_2.6H_2O$ together with 4 parts of acetyl chloride were added. The solution was heated at 145–155° C. for 6 hours, poured into mineral spirits, washed twice with water and the solvent then removed with steam, the final temperature of the resin being 210° C. R & B M. P. 89° C.; acid number 159, grade I. A sample of this resin was steamed gently at 265–275° C. for 1 hour, grade N; R & B M. P. 88° C.; acid number 156; ash 0.008%.

Example IV 500 parts of WW gum rosin M. P. 76° C., A. N. 169 was heated to 150° C. and 4.4 parts of $CoCl_2.6H_2O$ together with 10 parts of benzoyl chloride were added. Stirring was continued at 150° C. for 4 hours, mineral spirits was added and the resulting solution washed with dilute HCl and finally twice with hot water. The solvent was removed with steam, the final temperature of the resin being 210° C. R & B M. P. 92° C.; acid number 164, grade H.

Example V 1000 parts of WG gum rosin M. P. 76° C., A. N. 167 was dissolved in 250 parts of mineral spirits and 7 parts of $CoCl_2.6H_2O$ together with 6 parts of $Br_2$ was added to the solution which was then heated at 140–150° C. for 5 hours. The solution was then diluted with mineral spirits and washed four times with hot water.

The solvent was removed with steam, the final temperature of the resin being 220° C., R & B M. P. 97° C., A. N. 150, grade K.

Blank I 400 parts of WG-gum rosin from which the metals had been removed by an acid wash of the original gum was dissolved in 100 parts of acetic acid and 1.6 parts of $Cl_2$ added. The solution was kept at a gentle reflux temperature for 6 hours, poured into mineral spirits, washed twice with hot water and run down to resin with steam. The final temperature of the resin was 200° C. M. P. R & B 81° C.; acid number 164. The melting point of the original resin was 80° C. and the acid number 165.

Blank II 500 parts of metal free K gum rosin of M. P. 84° C., A. N. 169 was dissolved in 125 parts of mineral spirits and 2.5 parts of $Cl_2$ added. The solution was heated at 140–150° C. for 5 hours, diluted with solvent and washed three times with hot water. The solvent was removed with steam, the final temperature of the resin being 220° C. grade H, M. P. 83° C., A. N. 170.

From a comparison of these "blanks" with the preceding examples, it is seen that in the absence of a cobaltous halide, and in the presence of free acid, no polymerization is effected.

From the foregoing examples and explanations, it will be recognized that the invention in its broadest aspects relates to the polymerization of rosin in liquid phase, either as molten rosin or as a solution of rosin in a suitable inert solvent, by means of cobaltous chloride or bromide as polymerization catalyst. In a more limited aspect, the effectiveness of these catalysts is preferably enhanced by the presence, during polymerization, of free hydrochloric or hydrobromic acid. The cobaltous chloride or cobaltous bromide may be employed as such, or may be generated in situ either by reaction of a low-valent oxidic cobalt compound with hydrogen chloride or hydrogen bromide, or by reaction of cobaltous iodide or cobaltous fluoride with either of the acids. In each aspect of the invention the hydrohalogen acid which is employed may be introduced as such, or it too may be formed in situ by employing a halogen-containing material which produces the desired hydrogen halide under the conditions of treatment.

It will be recognized that the invention also contemplates the treatment of the polymerized rosin, (as produced by any of the forms of the invention just described above) by a washing step the purpose of which is to remove the catalyst, by a treating step which separates the polymerized rosin from any solvent which may have been employed during the polymerization process or washing step, and by a sparging step having the function of removing any loosely-combined hydrogenhalide remaining in the polymerized rosin after the washing and solvent-separation steps.

The polymerization step effected by the use of the herein disclosed catalysts, activated or not with free acid, may be carried out at the indicated temperatures for periods of time of from about ½ hour to about 100 hours, or for sufficient time to effect polymerization of at least some of the rosin. Considerable polymerization, as indicated by the higher melting points of the products of the treatments shown in the examples, can be accomplished in a matter of a few hours, and for most purposes a treatment lasting from about ½ hour to about 30 hours is adequate to accomplish commercially desirable results.

Having described the invention, I claim:

1. The process for polymerizing rosin which comprises the step of treating rosin in liquid phase with a small amount to about 10% of a catalytic material selected from the group consisting of cobaltous chloride and cobaltous bromide, for a time of between about one-half to about 100 hours, at temperatures between about 50° C. and 165° C.

2. The process for polymerizing rosin which comprises the step of treating rosin in liquid phase with a small amount to about 10% of a catalytic material selected from the group consisting of cobaltous chloride and cobaltous bromide, for a time of between about one-half hour and about 100 hours, at temperatures between about 50° C. and 165° C., said catalytic material being formed in situ by reaction of (1) a cobalt-containing material selected from the group consisting of metallic cobalt and cobaltous oxide, hydroxide, carbonate, iodide and fluoride, with (2) a hydrogen halide selected from the group consisting of hydrogen chloride and hydrogen bromide.

3. The process of claim 2, wherein said hydrogenhalide is in excess of the amount required to react stoichiometrically with said cobalt-containing material, thereby providing free hydrogenhalide.

4. The process for polymerizing rosin which comprises the step of treating rosin in liquid phase with a small amount to about 10% of a catalytic material selected from the group consisting of cobaltous chloride and cobaltous bromide, for a time of between about one-half hour and about 100 hours, at temperatures between about 50° C. and 165° C., said catalytic material being formed in situ by reaction of (1) a cobalt-containing material selected from the group consisting of metallic cobalt and cobaltous oxide, hydroxide, carbonate, iodide and fluoride, with (2) a halogen-containing substance capable of yielding under the conditions of treatment a hydrogen-halide selected from the group consisting of hydrogen chloride and hydrogen bromide.

5. The process of claim 4, wherein said halogen-containing substance is in excess of the amount required to effect a stoichiometric reaction between said hydrogenhalide and said cobalt-containing material.

6. The process for polymerizing rosin which comprises the step of treating rosin in liquid phase with a small amount to about 10% of a catalytic material selected from the group consisting of cobaltous chloride and cobaltous bromide, in combination with a small amount of a free hydrogenhalide selected from the group consisting of hydrogen chloride and hydrogen bromide, said treating step being carried on at temperatures between about 50° C. and 165° C. for a time sufficient to effect polymerization of at least a part of the rosin.

7. The process for polymerizing rosin which comprises the step of treating rosin in liquid phase with from .01% to about 1% of a catalytic material selected from the group consisting of cobaltous chloride and cobaltous bromide in combination with a small amount of free hydrogenhalide selected from the group consisting of hydrogen chloride and hydrogen bromide, said treating step being carried on at temperatures between about 50° C. and 165° C. for a time of between about one-half hour and 100 hours.

8. The process of claim 7 wherein said rosin in liquid phase consists of a solution of rosin.

9. The process of claim 7 wherein said rosin in liquid phase consists of rosin dissolved in a solvent, and the process includes the additional steps of washing the treated rosin solution, thereafter separating the solvent from said solution to recover the polymerized rosin, and sparging the polymerized rosin at temperatures between about 250° C. and 340° C. with an inert gas to remove loosely combined hydrogenhalide from said polymerized rosin.

10. The process of claim 7 wherein said catalytic material is used in amounts of between about 0.3% and 0.7%.

11. The process of claim 7 wherein said free hydrogenhalide is obtained in situ from a halogen-containing substance capable of yielding the said hydrogenhalide under the conditions of treatment.

12. The process as claimed in claim 1 wherein from about 1% to 5% of said catalytic material is employed.

13. The process for polymerizing rosin which comprises the steps of: treating molten rosin with from .01% to about 1% of a catalytic material selected from the group consisting of cobaltous chloride and cobaltous bromide in combination with a small amount of free hydrogenhalide selected from the group consisting of hydrogen chloride and hydogen bromide, said treatment being carried on at temperatures between the melting point of the rosin and about 165° C. for a time sufficient to effect polymerization of at least some of said rosin; thereafter dissolving the treated rosin in solvent to form a washable solution; washing the rosin solution; separating the solvent from said washed solution to recover the treated rosin; and sparging the recovered rosin at temperatures between 250° C. and 340° C. with inert gas to remove loosely-combined hydrogenhalide therefrom.

14. The process as claimed in claim 13 wherein from about 0.3% to 0.7% of said catalytic material is employed.

BURT L. HAMPTON.

REFERENCES CITED

The following references are of record in the file of this patent:

UNITED STATES PATENTS

| Number | Name | Date |
| --- | --- | --- |
| 2,263,915 | Borglin | Nov. 25, 1941 |
| 2,298,270 | Auer | Oct. 13, 1942 |